United States Patent
Chen et al.

(10) Patent No.: US 11,675,648 B2
(45) Date of Patent: Jun. 13, 2023

(54) AUTOMATIC TRIAGING OF DIAGNOSTICS FAILURES

(71) Applicant: Microsoft Technology Licensing, LLC, Redmond, WA (US)

(72) Inventors: Tianyi Chen, Sammamish, WA (US); Usama Khurshid Haq, Bellevue, WA (US); Muskan Kukreja, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/241,675

(22) Filed: Apr. 27, 2021

(65) Prior Publication Data
US 2022/0365834 A1 Nov. 17, 2022

(51) Int. Cl.
*G06F 11/07* (2006.01)
*G06N 20/00* (2019.01)

(52) U.S. Cl.
CPC ........ *G06F 11/079* (2013.01); *G06F 11/0754* (2013.01); *G06F 11/0793* (2013.01); *G06N 20/00* (2019.01)

(58) Field of Classification Search
CPC .............. G06F 11/079; G06F 11/0709; G06F 11/0754; G06F 11/0793; G06F 11/3452; G06F 11/3466; G06N 20/00
See application file for complete search history.

(56) References Cited

U.S. PATENT DOCUMENTS

| | | | |
|---|---|---|---|
| 10,057,142 B2* | 8/2018 | Vangala | H04L 43/028 |
| 10,242,201 B1* | 3/2019 | Chen | G06F 21/552 |
| 2008/0301501 A1* | 12/2008 | Grant | G06F 11/079 |
| | | | 707/999.102 |
| 2013/0179736 A1* | 7/2013 | Gschwind | G06F 11/3075 |
| | | | 714/37 |
| 2016/0057041 A1 | 2/2016 | Gupta et al. | |

(Continued)

FOREIGN PATENT DOCUMENTS

CN 111752734 A * 10/2020

OTHER PUBLICATIONS

"International Search Report and Written Opinion Issued in PCT Application No. PCT/US22/023214", dated Jul. 38, 2022, 12 Pages.

*Primary Examiner* — Matthew M Kim
*Assistant Examiner* — Kyle Emanuele (57) ABSTRACT

Non-limiting examples of systems, methods, and devices for automatic triaging of diagnostic failures for heterogeneous groups of tenants of a Software-as-a-Service, multi-tenant environment are disclosed herein. In an implementation, telemetry data for the heterogeneous groups of tenants is analyzed to classify individual tenant failures and detect the health status of the individual tenant. Tenant failures and/or tenant health statuses are filtered according to a threshold level. Anomalies having metrics that meet or exceed the threshold level are further analyzed to determine their priority (e.g., to a specific tenant). If the anomalies are known, then an existing entry for the anomaly is tagged and its priority may be changed. If the anomalies are unknown, then an entry is generated for the anomaly and prioritized. Tenants may be notified of a detected anomaly and may provide feedback. The feedback may be used to update triaging models.

20 Claims, 8 Drawing Sheets

(56) References Cited

U.S. PATENT DOCUMENTS

| | | | | |
|---|---|---|---|---|
| 2016/0350763 | A1* | 12/2016 | Avila | G06F 16/24578 |
| 2017/0034023 | A1* | 2/2017 | Nickolov | H04L 43/0817 |
| 2018/0260760 | A1* | 9/2018 | Srivastava | G06N 5/04 |
| 2018/0285204 | A1* | 10/2018 | Dwarampudi | G06F 11/3034 |
| 2019/0080251 | A1* | 3/2019 | Shyamal | G06N 5/04 |
| 2019/0138964 | A1* | 5/2019 | Morita | G06Q 10/06315 |
| 2019/0372827 | A1 | 12/2019 | Vasseur et al. | |
| 2020/0005093 | A1* | 1/2020 | Vichare | G06K 9/6223 |
| 2020/0204569 | A1* | 6/2020 | Komarek | G06K 9/6269 |
| 2020/0293495 | A1* | 9/2020 | Balachandran | G06F 16/128 |
| 2021/0064458 | A1* | 3/2021 | Rathinasabapathy | G06F 11/079 |
| 2021/0240683 | A1* | 8/2021 | McCain | G06F 16/217 |
| 2021/0328888 | A1* | 10/2021 | Rath | H04L 43/06 |
| 2022/0124110 | A1* | 4/2022 | Chhabra | H04L 63/1425 |

\* cited by examiner

AUTOMATIC TRIAGING OF DIAGNOSTICS FAILURES

TECHNICAL FIELD

Various embodiments of the present technology generally relate to software diagnostics. More specifically, some embodiments of the present technology relate to platforms and tools for triaging software failures.

BACKGROUND

Distributed computing systems (e.g., cloud computing systems) use computing resources interconnected over a network to support service models like Software-as-a-Service (SaaS), Platform-as-a-Serve (PaaS), and Infrastructure-as-a-Service (IaaS). These service models may be used by disparate customers having diverse computing environments in which the SaaS, PaaS, and/or IaaS solutions may be executed.

Differences in execution environments can cause a SaaS solution to behave differently depending on which set of users (e.g., industry, business, department, etc.) is employing the SaaS solution. For example, a tenant of a multi-tenant environment may be associated with a particular industry and may implement a software application (e.g., execute a cloud-based application on a local device, etc.) in a manner that differs from other tenants of the multi-tenant environment. Additionally, some tenants may incorporate third party dependencies like add-ins or Okta® type logins, which may also cause variations in performance of the SaaS product.

Finding the causes of failures in SaaS products and prioritizing responses to those failures can be extremely difficult. Some solutions prioritize failures based on an aggregate number of affected users regardless of the impact to or consequence experienced by individual customers/tenants. Other solutions wait for customers/tenants to identify failures and proactively search for solutions or launch a service ticket with a SaaS provider. Failing to adequately identify glitches and prioritize responses results in poor performance of a software solution for at least some sets of users.

The subject matter claimed herein is not limited to embodiments that solve any disadvantages or that operate only in the environments described above. Rather, this background is only provided to illustrate an exemplary technology area in which some embodiments described herein may be practiced.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for triaging diagnostic failures of tenants of a multiplexed environment of products and services. An anomaly triage application or service may receive error logs associated with tenants of a multiplexed environment and may aggregate data from the error logs into a compilation of census data. Anomalies in the census data may be identified by the anomaly triage application, which calculates a failure-hash for the identified anomalies. The anomaly triage application or service may classify the health of one or more of the tenants of the multiplexed environment.

Priority information may be generated for, and a priority ranking may be assigned to, an anomaly based at least on the failure-hash of the anomaly and the health of one or more of the tenants. When the priority ranking is equal to or greater than a nuisance threshold, then the anomaly is selected for further analysis.

A repository of mitigation efforts associated with known anomalies may be analyzed to detect the presence of one or more of mitigation efforts that would repair and/or patch the identified anomalies. When a mitigation effort is located in the repository, then an entry for the mitigation effort may be modified and/or updated with priority information. When a mitigation effort is not detected in the repository, then an entry is generated for at least an anomaly of the identified anomalies and tagged with the priority information. The repository may then be updated with the generated entry.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of systems, methods, and devices for automatic triaging of diagnostic failures for heterogeneous groups of tenants in multi-tenant environments are disclosed herein. Multitenancy is a type of architecture where multiple tenants share the same physical instance of an application. Although tenants share physical resources such as virtual machines, storage, etc., each tenant gets its own logical instance of the application. Additionally, each tenant's data is isolated from exposure to other tenants and may be further segregated according to, for example, various business units of a tenant. Though various embodiments are described in a context of a multi-tenant, networked computing environment, those skilled in the art will readily understand that the disclosed systems, devices, and methods can be readily implemented in other computing environments.

Diagnostic telemetry data may be collected for each tenant of a multi-tenant environment and examined to identify failure issues (e.g., anomalies, bugs, glitches, other performance issues, etc.), third party software dependencies (e.g., add-in's, plug-in's, etc.), and impacts to a tenant's operations. Diagnostic telemetry data may be supplied to machine learning environments to classify failures of a tenant, detect the health status of a tenant, pool and/or aggregate telemetry data, determine a severity of an anomaly and/or predict the impact an anomaly may have on a tenant, and the like.

For example, a machine learning environment may be configured to classify and prioritize failures that have an outsized impact on an individual tenant/customer. Failures having an outsized impact may be detected and identified based at least on an analysis of telemetry data obtained from one or more tenants. The failures are filtered and prioritized according to their respective impact on an individual tenant/customer. If a mitigation effort applicable to the filtered failure does not exist, then a mitigation ticket may be generated and prioritized for the failure. If a mitigation effort applicable to the filtered failure does exist, then the existing ticket may be modified (e.g., update metadata of the existing ticket) and a priority of the ticket changed.

The systems, methods, and devices for automatic triaging of diagnostics failures described herein provide an auto-debugging/auto-tagging system that improves enterprise customer health and reduces the time-to-detect of enterprise blocking anomalies. Due in part to time and resource constraints, existing solutions fail to adequately address anomalies that occasionally cause a software product to crash and/or identify severe anomalies that only impact a few tenants/customers. The systems, methods, and devices described herein provide an improvement over existing solutions at least by providing an inventive means for triaging anomalies detected in tenant telemetry data and updating mitigation efforts accordingly.

Figure 1:
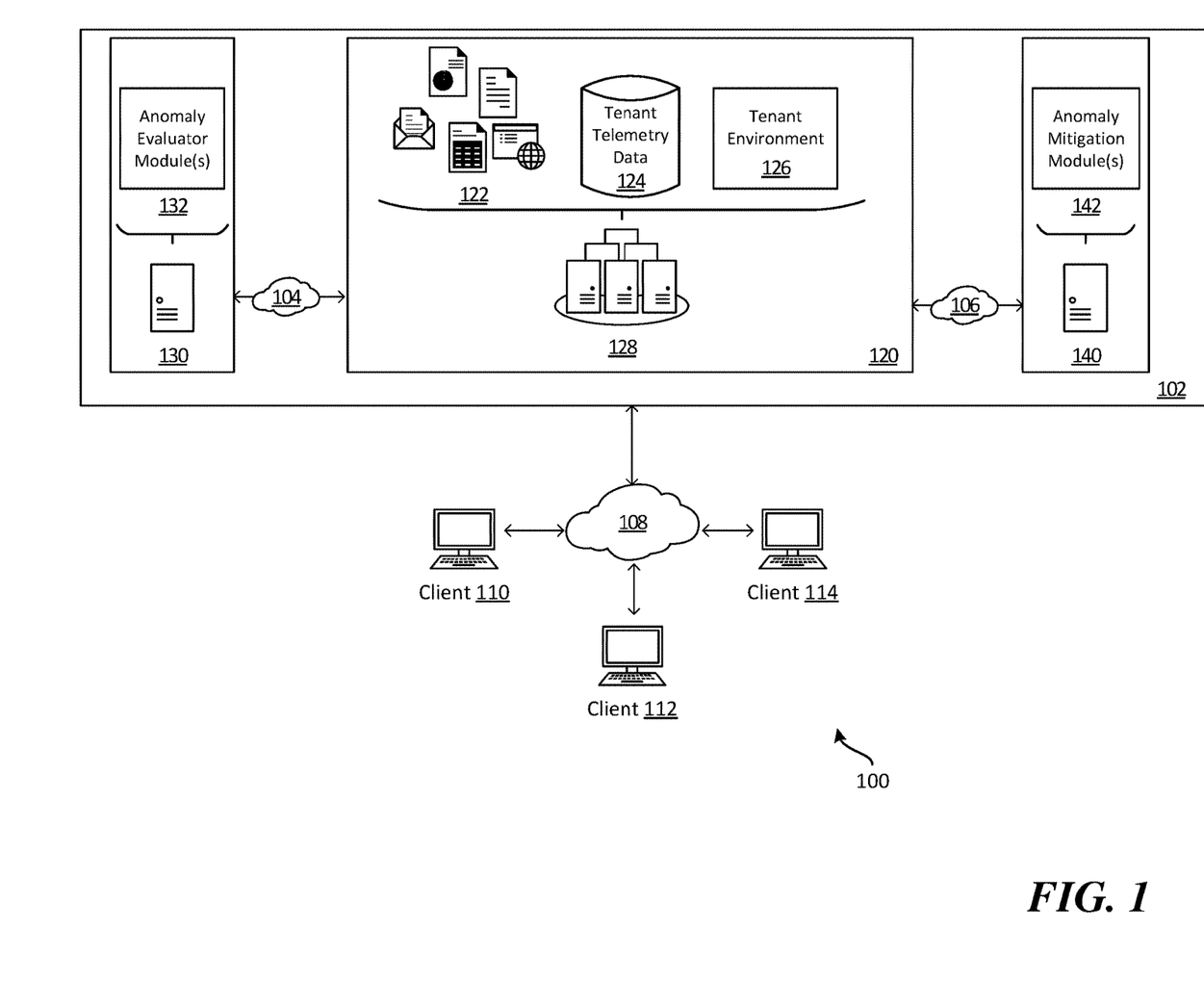
FIG. 1 is a schematic diagram illustrating an example distributed computing environment for triaging diagnostics anomalies.

Referring now to the drawings, FIG. 1 is a schematic diagram illustrating an example distributed computing environment 100 for triaging diagnostics anomalies of tenants of a multi-tenant environment of products and services. Distributed computing environment 100 includes multi-tenant architecture 102, networks 104, 106, and 108, and clients 110, 112, and 114. Multi-tenant architecture 102 contains resource environment 120, which comprises shared physical resources 128. Shared physical resources 128 is illustrative of one or more servers that may host one or more application services (e.g., application services 122), telemetry data generated for one or more tenants (e.g., telemetry data 124), and/or one or more tenant environments (e.g., tenant environment 126).

Application services 122 may include one or more of personal information management services (email, calendar, etc.), document productivity services (word processing, spreadsheets, presentations, and collaboration, etc.), tele-communication services (voice calls, video conferencing, etc.), gaming services, social networking services, media services (music, videos, etc.), and e-commerce services, as well as any other service, combination of services, or variations thereof. Telemetry data 124 includes diagnostics data, census data, measurement data, statistical data, and the like. Telemetry data 124 may also include operating system data, application data, usage data, tenant identifiers (e.g., tenant name, tenant domain, unique identifiers, ip address, etc.), event logs, and the like.

Tenant environment 126 includes a tenant created for a specific subscriber/customer/client of a SaaS product (e.g., clients 110-114 represent subscribers and/or customers of application services 122). The tenant provides a group of users, who share a common access, with specific privileges to the SaaS product (e.g., client 110 comprises a group of users who share a common access to application services 122). Tenant environment 126 may comprise a multitenancy architecture where multiple tenants share the same physical instance of an application. Although tenants share physical resources such as virtual machines, storage, etc. (e.g., shared physical resources 128), each tenant gets its own logical instance of the application. Application data of a tenant is siloed such that the application data may be shared among users within a tenant but not shard with other tenants. Tenant environment 126 may generate at least some portion of telemetry data 124 (e.g., all of telemetry data 124, less than all of telemetry data 124, etc.).

Multi-tenant architecture 102 also contains server computing device 130, which is illustrative of one or more servers that may host one or more machine learning (ML) services (e.g., anomaly evaluator module 132). Telemetry data may be supplied to server computing device 130 and processed using anomaly evaluator module 132 (e.g., to triage diagnostics anomalies, classify failures that have an outsized impact on an individual tenant/customer, etc.). In some embodiments, shared physical resources 128 includes server computing device 130.

Multi-tenant architecture 102 also contains server computing device 140, which is illustrative of one or more servers that may host one or more anomaly mitigation services (e.g., anomaly mitigation module(s) 142). Telemetry data may be supplied to server computing device 140 and processed using anomaly mitigation module(s) 142 (e.g., for triaging diagnostics anomalies, auto-debugging, auto-tagging, etc.). In some embodiments, shared physical resources 128 includes server computing device 140.

Any of the computing devices described herein may communicate with one another via a network (e.g., the Internet). For example, server computing device 130 communicates with multi-tenant architecture 102 via network 104, server computing device 140 communicates with multi-tenant architecture 102 via network 106, and clients 110-114 communicate with multi-tenant architecture 102 via network 106.

Figure 2:
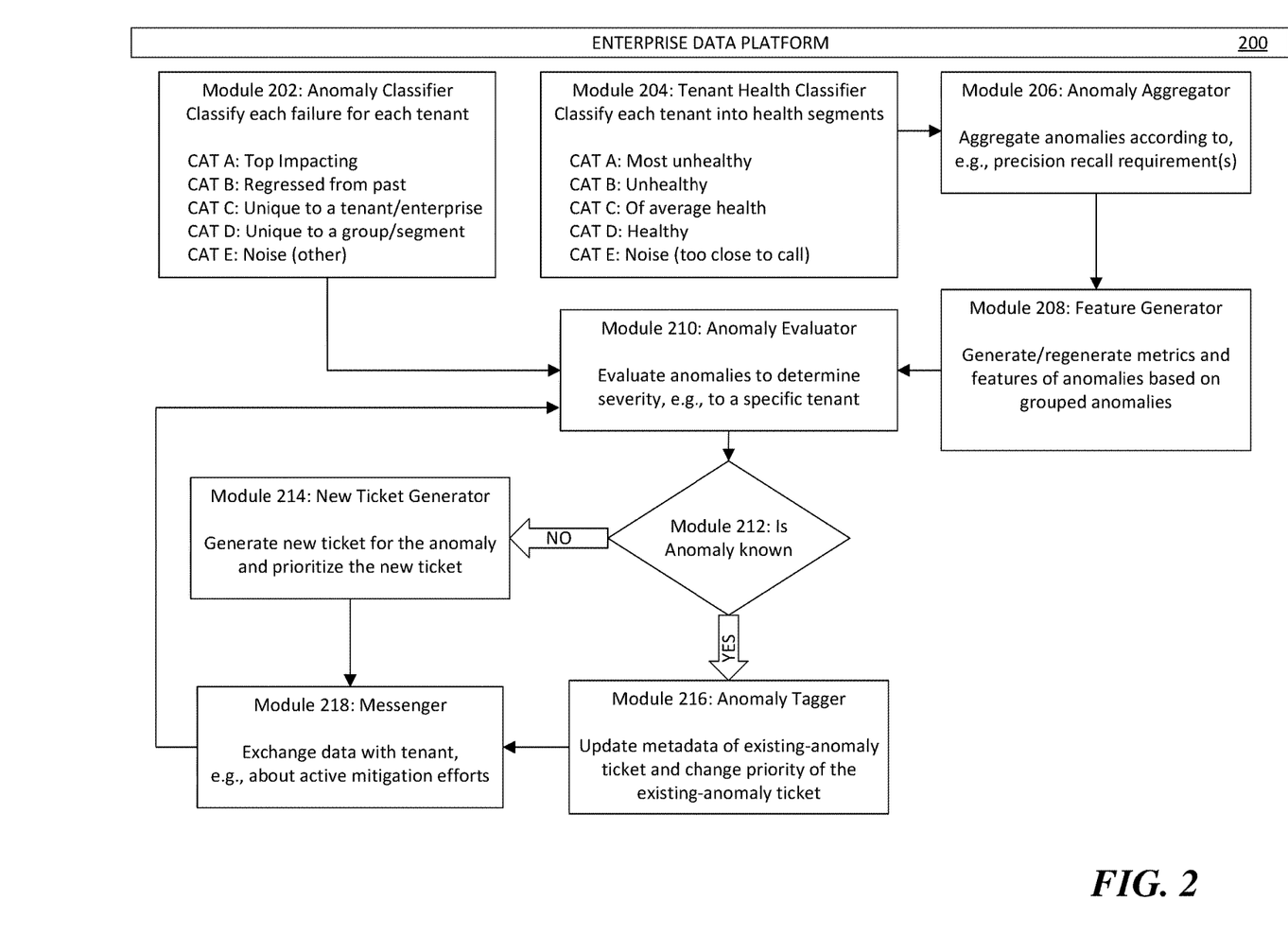
FIG. 2 is a schematic diagram illustrating an implementation of triaging diagnostics anomalies.

FIG. 2 is a schematic diagram illustrating an implementation of enterprise data platform 200 for triaging diagnostics anomalies of tenants of a multi-tenant environment of products and services. Enterprise data platform 200 may be an embodiment of multi-tenant architecture 102 and/or an embodiment of an application service hosted on shared physical resources 128 of multi-tenant architecture 102. Enterprise data platform 200 may be configured to perform, run, execute, or otherwise implement one or more of triage modules 202-218.

Figure 3:
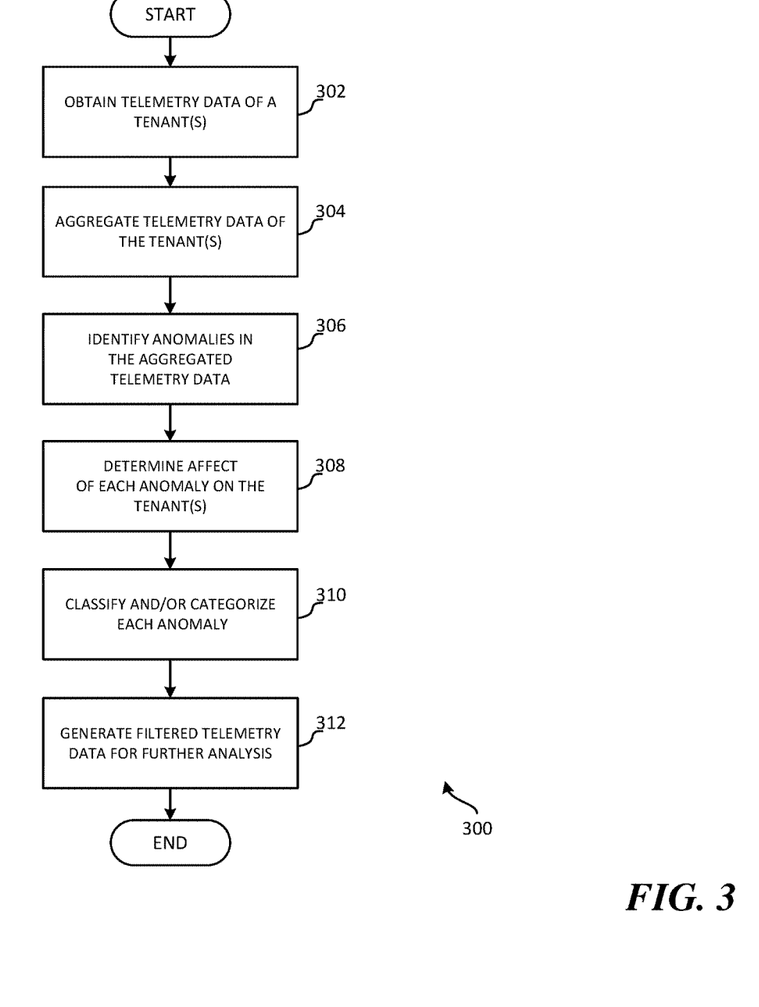
FIG. 3 illustrates a method for an implementation of classifying and selecting anomalies identified in telemetry data of tenants of a multi-tenant environment of products and services.

Referring parenthetically to the steps illustrated in FIG. 3, enterprise data platform 200, via module 202, employs anomaly classification process 300 to detect anomalies (e.g., failures, latencies, crashes, usability bugs, missing features, etc.) in telemetry data of one or more tenants and classify the anomalies into different categories of anomaly signals. For example, enterprise data platform 200, via module 202, may access, retrieve, receive, or otherwise obtain telemetry data of one or more tenants (e.g., from one or more tenant environments, from a storage location hosting aggregate telemetry data, etc.) (step 302). The telemetry data may comprise data collected for one or more tenants over a period of time (e.g., once a day, multiple times a day, multiple days, etc.). If not already aggregated, then the telemetry data may be aggregated to include all, or a portion, of the data collected for one or more tenants over the period of time (step 304). For example, diagnostic logs may be collected for 30 days and aggregated to form a single, 30-day dataset that can be stored, processed, and/or analyzed.

Enterprise data platform 200, via module 202, identifies anomalies in the aggregated telemetry data (step 306) and generates a shell for each of the identified anomalies. The shell may include a description of one or more operating systems on which the anomaly occurred, one or more identifiers for applications that experienced the anomaly, one or more ip addresses of devices that experienced the anomaly, and/or one or more failure-hash values descriptive of the anomaly. Via module 202, a feature vector may be generated based at least on the shell. The feature vector may include a number of times the anomaly occurred (e.g., on a single device, across an enterprise, across multiple-enterprises, etc.), a rate of occurrence of the anomaly (e.g., on a single device, across an enterprise, across multiple-enterprises, etc.), device parameters (e.g., description(s) of the devices on which the anomaly occurred), third-party dependencies, SaaS product identifier, and the like.

Enterprise data platform 200, via module 202, may determine an effect of each anomaly with regard to one or more tenants (step 308) by analyzing and/or graphing the feature vectors of anomalies to calculate their distribution and/or probability density. For example, a failure curve may be generated for one or more of the identified anomalies (e.g., a failure curve may be generated for one or more of the anomalies comprised in the subset of feature vectors, etc.). Alternatively, a failure curve may be generated for every feature of a SaaS product. Failure curves may be compared against one or more thresholds to determine in which category to assign the anomaly.

Via module 202, anomalies are classified based at least on their respective effect on one or more tenants (step 310). For example, an anomaly may be classified into a category (e.g., Tier A) when an effect of the anomaly meets or exceeds an impact threshold. Example impact thresholds include effects of an anomaly that prevent an enterprise from performing some or all business operations (i.e., enterprise blocking), effects of an anomaly that are top impacting according to a failure curve of one or more tenants, and the like.

In another example, an anomaly may be classified into a category (e.g., Tier B) when an occurrence of the anomaly is spiking. An anomaly may be classified as spiking when there is a regression in one or more failure ratios associated with the anomaly as observed for one or more tenants. Other categories may comprise anomalies having unique characteristics. For example, one category may comprise anomalies that were classified using a term frequency-inverse document frequency (TF-IDF) algorithm to identify tenant-specific and/or cohort-specific anomalies based on impacts to one or more tenants.

Via module 202, filtered telemetry data may be generated by filtering the anomalies for further analysis (step 312). In an embodiment, a portion of the identified anomalies may have no clear signal and would be excluded from further analysis. For example, an anomaly may be placed in an excluded category when its failure curve is flat across all tenants. An anomaly may also be placed in an excluded category when the anomaly is associated with a small number of application sessions and/or classified as noise. The filtered telemetry data may be stored in a memory and/or sent to a machine learning environment for further analysis.

Figure 4:
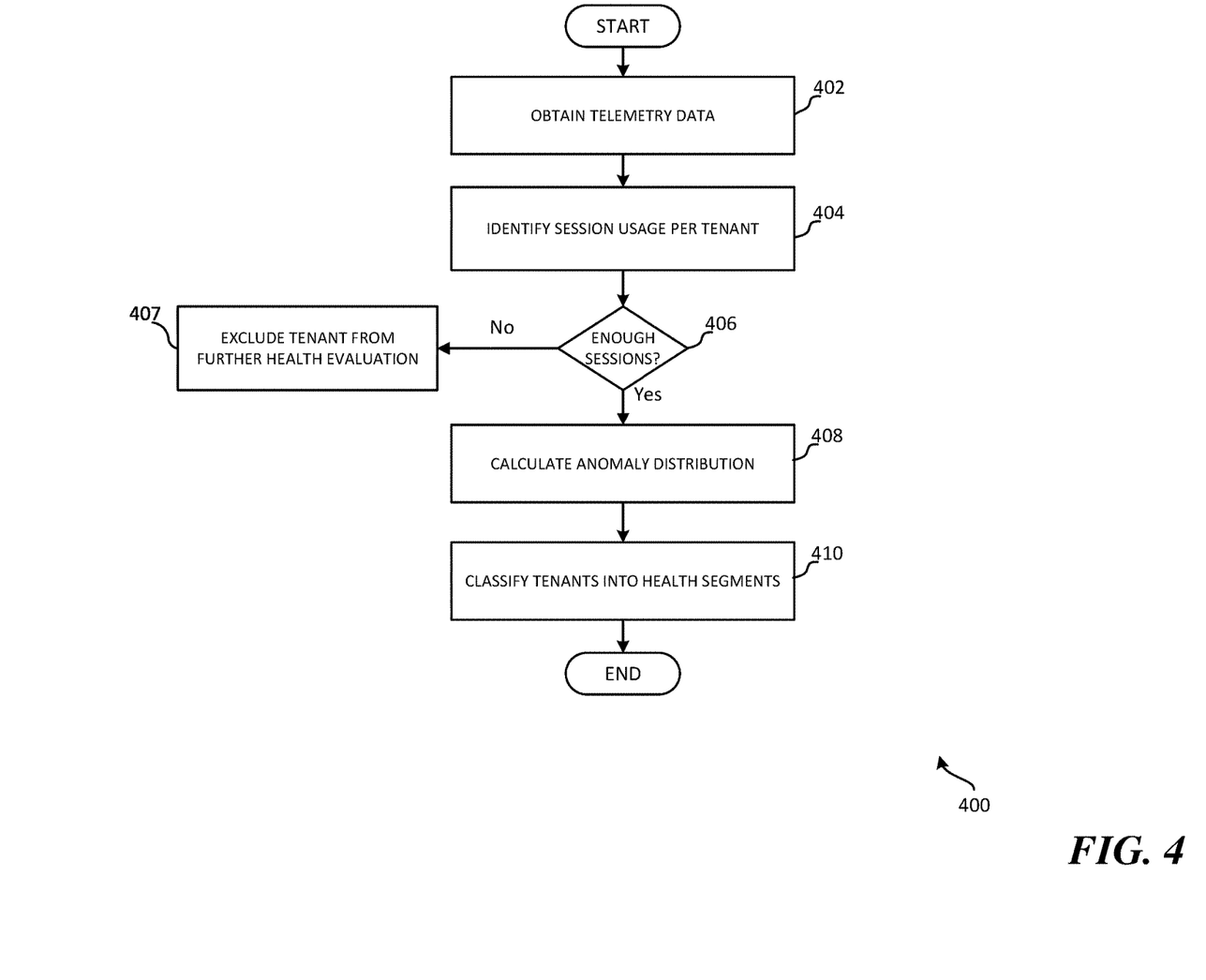
FIG. 4 illustrates a method for an implementation of classifying tenants of a multi-tenant environment of products and services.

Referring parenthetically to the steps illustrated in FIG. 4, enterprise data platform 200, via module 204, employs tenant health classification process 400 to classify the health of one or more tenants. For example, enterprise data platform 200, via module 204, may access, retrieve, receive, or otherwise obtain telemetry data for each of the one or more tenants (e.g., from one or more tenant environments, from a storage location hosting aggregate telemetry data, etc.) (step 402).

Enterprise data platform 200, via module 204, may analyze the telemetry data to determine a session usage of each application implemented by one or more tenants and an anomaly ratio for one or more anomalies identified in the telemetry data (step 404). The one or more tenants are filtered from future analysis based on the number of application sessions. For example, data of a tenant executing a small number of sessions of a particular SaaS product can cause significant fluctuations, noise, unwanted interferences, and/or otherwise degrade an evaluation of the tenant's health (e.g., if an anomaly has a binomial distribution with a small probability, then it would be very likely to encounter a 100% complete failure rate if a tenant implements only a small number of sessions). As a result, the one or more tenants may be filtered to produce a subset of tenants for further analysis. The subset of tenants may be selected based on a minimum number of sessions required to have a sufficient dataset for classifying tenant health. For example, the following equation may be implemented to produce the subset of tenants:

$$\begin{cases} np > 10 \\ n(1-p) > 10 \end{cases}$$

where n is a number of sessions of an application implemented (e.g., by a tenant), and p is a reported anomaly ratio calculated based on telemetry data (e.g., the telemetry data of the tenant). The minimum number of sessions may be application specific or include a combination of application sessions. For example, for one tenant to be qualified for a health evaluation they may have to implement 5,000 sessions of a presentation application, 2,500 sessions of a spreadsheet application, 1,000 sessions of a document productivity application, 500 sessions of a personal information management service, and/or some combination thereof.

Enterprise data platform 200, via module 204, may determine whether the number of sessions meets and/or exceeds the minimum number of sessions required to have a sufficient dataset for classifying tenant health (step 406). If a threshold number of sessions is not met and/or exceeded, then enterprise data platform 200, via module 204, excludes the tenant from further analysis of the tenant's health (step 407). If a threshold number of sessions is met and/or exceeded, then enterprise data platform 200, via module 204, includes the tenant in a calculation of an anomaly distribution across multiple tenants.

Enterprise data platform 200, via module 204, may calculate an anomaly distribution to determine the percentage of tenants that are affected by a failure (step 408). The anomaly distribution may include an analysis of the number of sessions, number of devices, and the like that are impacted by one or more anomalies. Tenants may then be assigned/sorted to health segments according to the anomaly distribution (step 410). In an embodiment, the anomaly distribution is compared to a health threshold to determine in which health segment to place the tenant. The health threshold may comprise a single value or a range of values (e.g., a low value, a high value, etc.). For example, tenants having hits at or below the low threshold value may be classified into one or more healthy categories having a low/non-urgent priority rating on a priority scale (e.g., CAT D: Healthy, etc.). Tenants having hits between the low threshold value and the high threshold value may be classified into one or more warning categories having a medium/semi-urgent priority rating on a priority scale (e.g., CAT C: Of average health, etc.), and tenants having hits at or above the high threshold value may be classified into one or more unhealthy categories having a high/urgent priority rating on a priority scale (e.g., CAT A: Most unhealthy, CAT B: Unhealthy, etc.).

Threshold values may be determined using one or more statistical methods (e.g., extreme quantile rule, three-sigma empirical rule with normal approximation, median absolute deviation (MAD) rule and interquartile range (IQR) rule, etc.). For example, a high threshold value may be determined by applying an ensemble model of P95, mean+3× standard deviation (logarithmic transformation of diagnostic data to assemble normal distribution), median+2×1.4826× MAD, median+3×interquartile range (IQR), to bootstrapped diagnostic data for a period of time. Similarly, the low threshold value may be determined by applying an ensemble model of P80, mean+2×standard deviation, median+1.4826×MAD, median+1.5×IQR, to bootstrapped diagnostic data for a period of time. To reduce false positive rates, an upper boundary of the confidence interval may be selected as an anomaly detection threshold, and statistical tests conducted to validate a significance level of the anomaly for one or more tenants having a small session usage.

Figure 5:
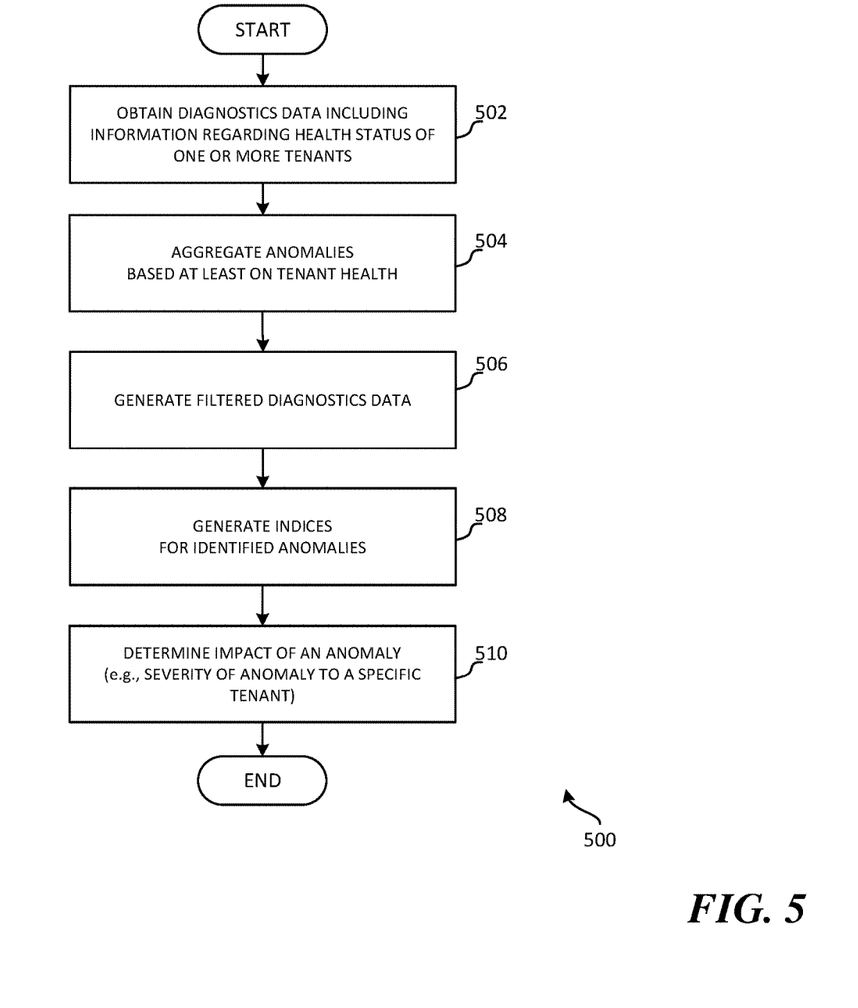
FIG. 5 illustrates a method for an implementation of determining an impact of an anomaly on one or more tenants of a multi-tenant environment of products and services.

Referring parenthetically to the steps illustrated in FIG. 5, enterprise data platform 200, via modules 206, 208, and 210, employs impact analyzer process 500 to determine a severity of an anomaly to a specific tenant. Via module 206, enterprise data platform 200 accesses, retrieves, receives, or otherwise obtains diagnostics data for one or more tenants including health segment data of module 204 (step 502). Via module 206, anomalies identified in the diagnostic data are aggregated according to the health status of one or more tenants (step 504). In an embodiment, tenant diagnostics data may reveal that most unhealthy tenants share a long-tail failure hash distribution with only a few top failure hashes occurring badly over their session usage. With limited time and/or resources available to address the identified anomalies, the most severe anomalies (e.g., anomalies having a significant intensity and widespread over large numbers of unhealthy tenants) may be filtered/selected for further analysis. Thus, filtered diagnostics data may be generated by filtering for diagnostic data belonging to tenants having an unhealthy classification (e.g., data of tenants in CAT A, data of tenants in CAT B, data of tenants in CAT A and CAT B, etc.) and/or excluding diagnostic data belonging to tenants having a healthy classification (e.g., data of tenants in CAT D, etc.) and/or excluding hits that are classified as noise (step 506). In an embodiment, the filtered diagnostics data comprises a summary of features of the diagnostics data as a weighted average over sessions each tenant conducted.

Enterprise data platform 200, via module 208, generates, regenerates, and/or identifies indices, metrics, and/or characteristics of anomalies in the diagnostic data filtered by module 206 (step 508). Examples of indices/metrics/characteristics of anomalies in the diagnostic data include percent of unhealthy tenants affected by the same or similar anomaly, overall hit-rate of an anomaly, percentage of tasks impacted due to an anomaly, and the like. In an embodiment, indices, metrics, and/or characteristics of anomalies in the filtered diagnostic data may be generated in response to a correlation observed/calculated/determined between the anomaly and the health of one or more tenants. Indices/metrics/characteristics of anomalies may be further filtered to exclude redundant features with high correlation pairs. Via module 208 and based on the indices, enterprise data platform 200 may determine and/or record whether an anomaly impacts one or more tenants, is a bug local to one tenant, is ubiquitous across the one or more tenants, etc. The indices, metrics, and/or characteristics may be stored in a memory and/or sent to a machine learning environment for further analysis.

Enterprise data platform 200, via module 210, determines an impact of an anomaly and predicts whether the anomaly will severely impact one or more tenants (step 510). Examples of a severe impact include an enterprise blocking impact, a department/unit blocking impact, task blocking impact, and the like.

In an embodiment, enterprise data platform 200 employs a machine learning environment to predict whether an anomaly will have a severe impact on one or more tenants. For example, filtered diagnostic data may be supplied to the machine learning environment for evaluation. The filtered diagnostic data may comprise the indices/metrics/characteristics of anomalies of module 208 and/or the filtered telemetry data of module 202. A machine learning environment may evaluate the filtered diagnostic data to identify key metrics. The filtered diagnostic data may comprise failure hashes for each anomaly identified therein, and the key metrics may be identified in the failure hashes. The machine learning environment may compare the key metrics against a learning model to identify a likelihood of failure.

A severity score for an anomaly may be generated by enterprise data platform 200 (e.g., via the machine learning environment) based on the likelihood of failure. The severity score represents a ranking of the anomaly based on a severity scale ranging from lowest to highest, not severe to highly impacting, and the like. Key metrics may be consumed to determine and/or calculate the severity score. The severity score may be determined and/or calculated according to the following equation:

$$\text{Severity Score}_i = \sum_{j=1}^{M} w_{ij} z_{ij} = \sum_{j=1}^{M} w_{ij} \frac{x_{ij} - \min_{i \in \{1, \dots, N\}} x_{ij}}{\max_{i \in \{1, \dots, N\}} x_{ij} - \min_{i \in \{1, \dots, N\}} x_{ij}}$$

where w is a feature importance weight, z is a threshold feature value, x is a raw feature value, subscript i,j indicates an anomaly sample (e.g., failure hash of anomaly per app) and feature of the anomaly, respectively. The severity score may be normalized based on a min-max normalization limit in a range (e.g., 0 to 1). On a lowest to highest scale, the higher the severity score, the higher the probability that an anomaly will be highly impacting to at least one tenant.

Anomalies having a severity score greater than or equal to a nuisance threshold may be selected for mitigation. The nuisance threshold has a boundary that corresponds to the severity scale, wherein a severity score of less than the nuisance threshold may indicate a non-severe impact to one or more tenants and wherein a severity score at or above the nuisance threshold may indicate a severe impact to one or more tenants. An enterprise blocking anomaly is an anomaly having a severity score greater than the nuisance threshold.

Figure 6:
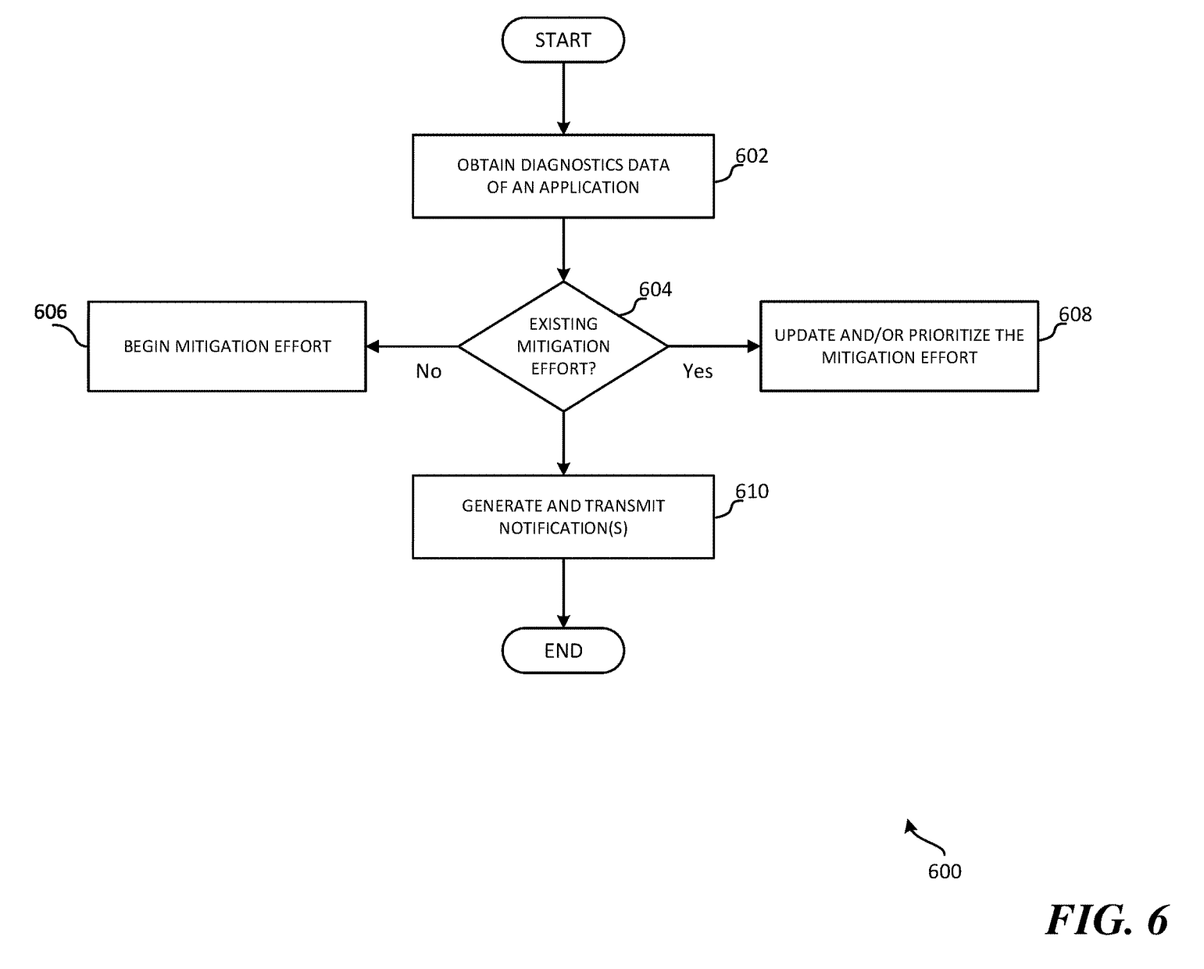
FIG. 6 illustrates a method for an implementation of triaging diagnostics anomalies.

Referring parenthetically to the steps illustrated in FIG. 6, enterprise data platform 200, via modules 212-218 employs mitigation process 600 to automatically triage anomaly mitigation efforts. Via module 212, enterprise data platform 200 accesses, retrieves, receives, or otherwise obtains diagnostics data of one or more applications (step 602) and determines if a mitigation effort exists that is applicable to one or more enterprise blocking anomalies (step 604). For example, a list, database, or other repository of mitigation efforts may be automatically (i.e., without direct intervention of a human end-user) analyzed, searched, or otherwise queried for a presence of an existing mitigation effort that would repair an enterprise blocking anomaly and/or an existing mitigation effort that is directed to developing a patch that could also repair the enterprise blocking anomaly.

If an existing mitigation effort that would repair and/or patch the enterprise blocking anomaly is not detected, identified, or otherwise discovered, then enterprise data platform 200, via module 214, automatically begins a mitigation effort for the anomaly (step 606). Beginning the mitigation effort may comprise generating a mitigation entry for the enterprise blocking anomaly. The mitigation entry may include details about the enterprise blocking anomaly (e.g., applications impacted by the anomaly, tenants impacted by the enterprise blocking anomaly, etc.). Enterprise data platform 200 automatically assigns a priority to the mitigation entry and prioritizes the mitigation entry according to the priority. The priority is determined based at least on the severity score of the enterprise blocking anomaly. Enterprise data platform 200 may then store the mitigation entry to/in the list, database, or other repository of mitigation efforts.

If an existing mitigation effort that would repair and/or patch the enterprise blocking anomaly is detected, identified, or otherwise discovered, then enterprise data platform 200, via module 216, automatically updates the existing mitigation effort with triage data (e.g., tenant specific tags, tenant related statistics, priority information, details about the anomaly not already included in the metadata of the existing mitigation effort, etc.) (step 608). In an embodiment, enterprise data platform 200 generates an updated mitigation entry comprising the triage data. Enterprise data platform 200 automatically assigns a priority to the updated mitigation entry. The updated mitigation entry is then prioritized according to the assigned priority. The priority is determined based at least on the severity score of the enterprise blocking anomaly. Enterprise data platform 200 may then store the updated mitigation entry to/in the list, database, or other repository of mitigation efforts.

In another embodiment, enterprise data platform 200 updates the existing mitigation effort by editing metadata of the existing mitigation effort and/or adding relevant tags to the metadata (e.g., adding tenant specific tags, adding tenant related statistics, adding priority information, etc.). Enterprise data platform 200 automatically assigns a priority to the existing mitigation effort and/or updates a priority of the existing mitigation effort. Updating the priority may include escalating the existing mitigation effort according to its priority in a ranked list of mitigation efforts or deescalating the existing mitigation effort according to its priority in the ranked list. The existing mitigation effort is then prioritized according to the assigned priority. The priority is determined based at least on the severity score of the enterprise blocking anomaly. Enterprise data platform 200 may then store the updated mitigation effort to/in the list, database, or other repository of mitigation efforts.

Enterprise data platform 200, via module 218, generates one or more notifications about active mitigation efforts (step 610). A notification may be transmitted to one or more tenants that are, or may be, impacted by one or more anomalies. A notification may be transmitted to one or more anomaly mitigation team members that are, or may be, responsible for repairing/patching an anomaly. Notifications may include updates on repair and/or patch operations, information about recently added repair and/or patch operations, instructions for a tenant, alerts for an anomaly mitigation team member, triage information transmitted for display in a dashboard or other user interface, and the like.

Tenants may respond to the one or more notifications via enterprise data platform 200. For example, a tenant may provide feedback about a mitigation effort and/or provide details about the impacts of an anomaly on an enterprise of the tenant. The information provided by the tenant may be used to update models of the machine learning environment.

Figure 7:
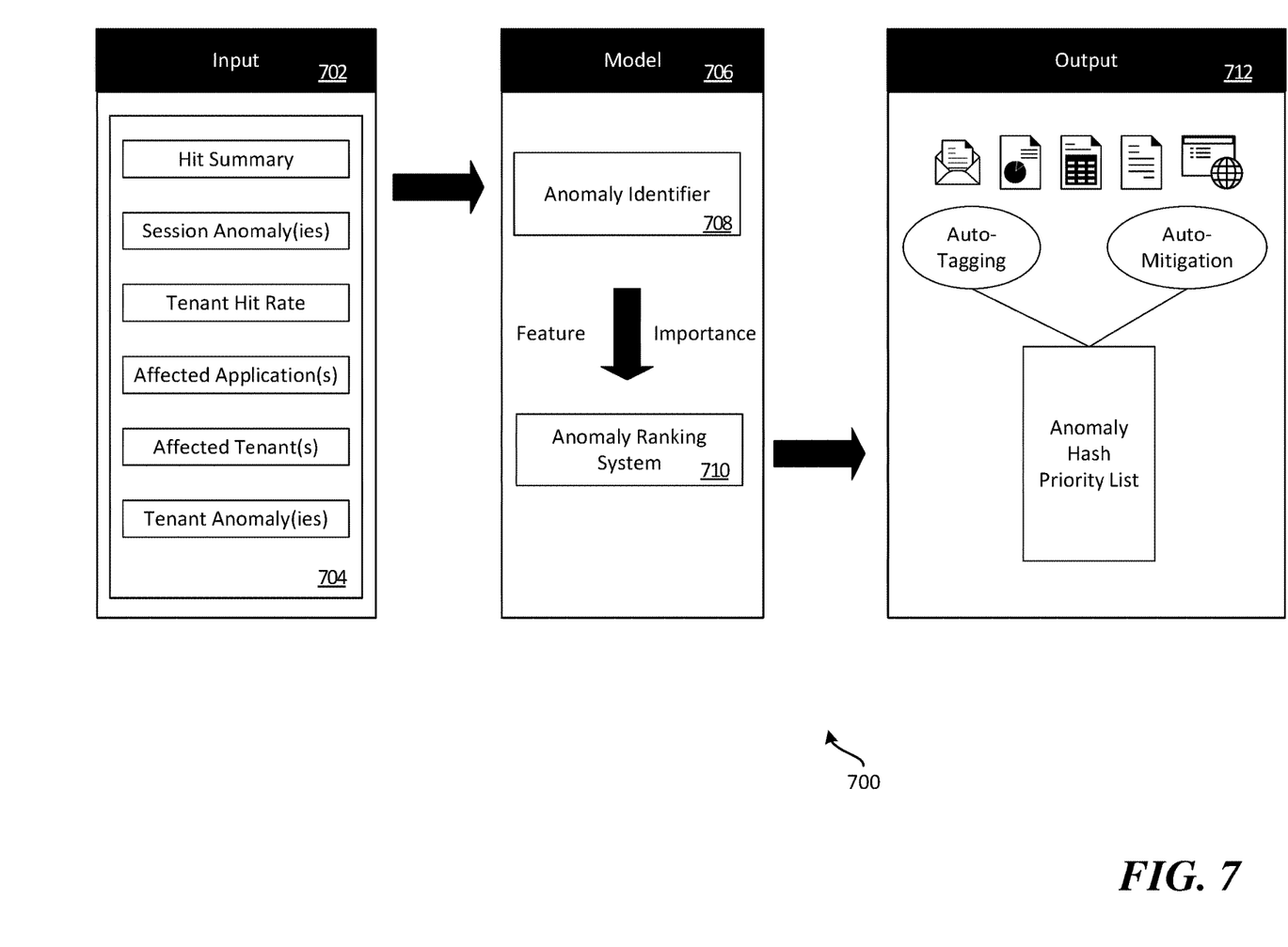
FIG. 7 illustrates an operational scenario in an implementation of triaging diagnostics anomalies.

FIG. 7 illustrates a simplified operational scenario 700 in an implementation of triaging diagnostics anomalies of tenants. Input engine 702 may produce feature vectors 704 for one or more anomalies. Feature vectors 704 may comprise one or more of a hit summary, a session anomaly, a tenant hit rate, an affected application, an affected tenant, a tenant anomaly, and the like. Input engine 702 may generate feature vectors 704 based on manually created anomalies and/or from diagnostic telemetry data of one or more tenants of a multi-tenant environment. Input engine 702 may supply feature vectors 704 to model 706.

Model 706 may comprise a supervised learning model, an unsupervised learning model, and/or a combination of supervised and unsupervised learning models. Model 706 may be trained using manually created inputs (e.g., manually created anomalies) and/or using inputs derived from tenant telemetry data (e.g., by consuming feature values of leading indicators of failure hashes and normalized distances). In an embodiment, model 706 comprises anomaly identifier 708 and anomaly ranking system 710. Anomaly identifier 708 may include thresholds for selecting and otherwise filtering anomalies in telemetry data. Example threshold values include a minimum number of total failure sessions, a minimum hit rate, a minimum session ppm, and the like. The threshold values may be criteria included in the analysis in addition to the severity scoring system. Anomaly ranking system 710 may be trained to determine a severity score of an anomaly based on leading indicators of failure hashes of anomalies identified in telemetry data.

Custom parameters may also be added to Model 706, for example, to create and manage configurations for automatic anomaly detection and/or tagging of existing anomalies. An end user may specify the exact parameters on which they want anomalies to be created and/or tagged, as well as specifying a custom list of tags in the event of auto-tagging. Default parameters may include maximum anomalies per day per configuration, a minimum score and/or failure hits on which to report an anomaly, the minimum hit rate and/or number of sessions, and the like. The flexibility of model 706 allows quick validation and development of solutions instead.

Output engine 712 may generate an anomaly hash list of one or more enterprise blocking anomalies based on anomaly ranking information received from model 706. Enterprise blocking anomalies are anomalies occurring in software applications that have a negative impact on an operation of one or more tenants (e.g., a severe impact, a crash, etc.). The anomaly hash list may be used to automatically tag existing mitigation efforts and/or automatically begin a mitigation effort for anomalies included in the anomaly hash list.

Figure 8:
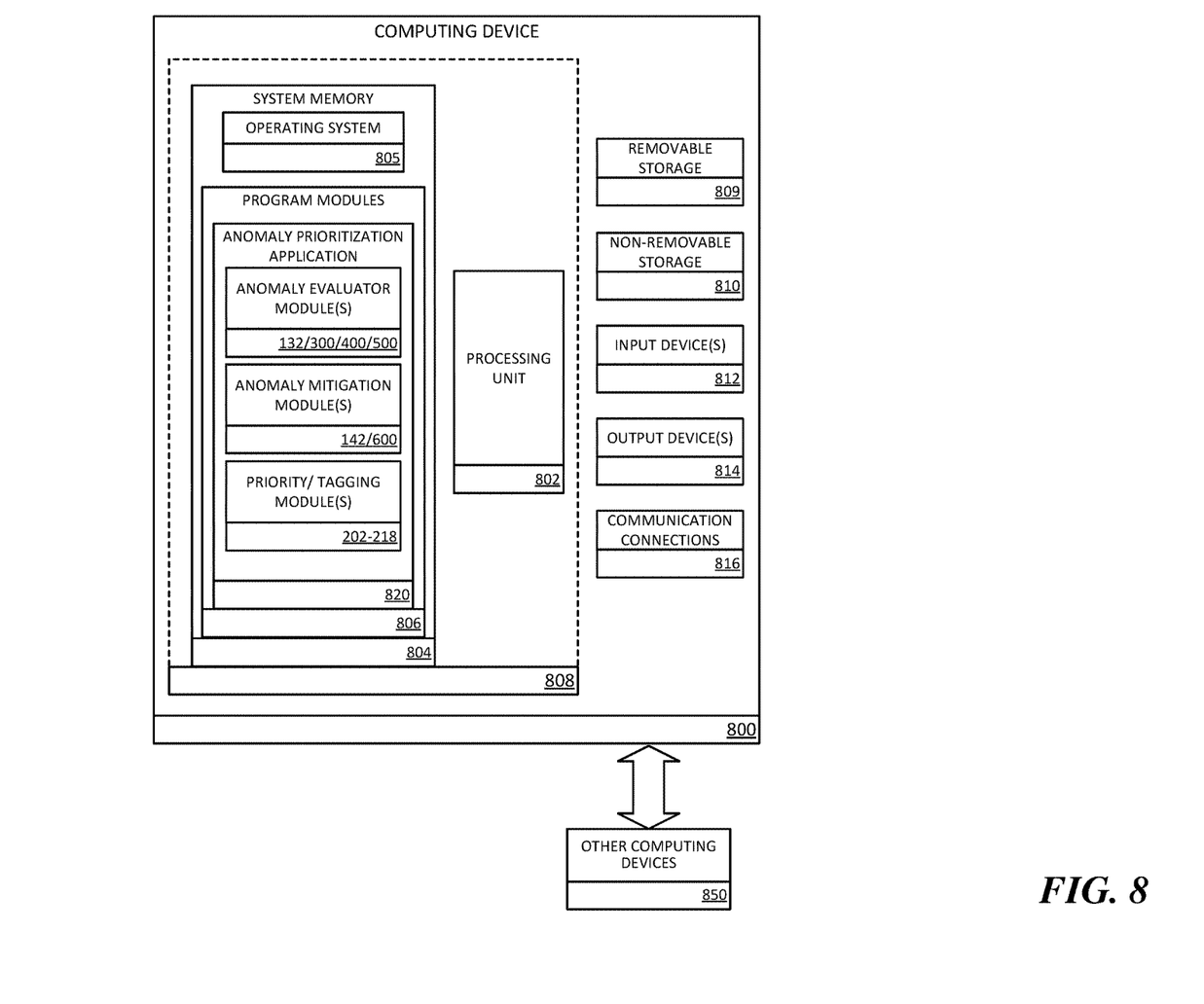
FIG. 8 is a simplified block diagram of a distributed computing system in which aspects of the present disclosure may be practiced.

FIG. 8 is a block diagram illustrating physical components (e.g., hardware) of a computing device 800 with which aspects of the disclosure may be practiced. The computing device components described below may have computer executable instructions for training or executing one or more language detection models. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more linguistic and/or natural language processing programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., anomaly prioritization application 820) may perform processes including, but not limited to, the aspects, as described herein. Anomaly prioritization application 820 may include anomaly evaluator module(s) 132/300/400/500, anomaly mitigation module(s) 142/600, and triaging module(s) 202-218, which may be deployed as described in FIGS. 1-7.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer readable media does not include a carrier wave or other propagated or modulated data signal. Computer readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computing device comprising:
   a memory for storing executable program code;
   a processor functionally coupled to the memory; and
   the executable program code that, when executed by the computing device, directs the processor to:
      determine a health classification for a tenant, in a multi-tenant environment, based on diagnostic information associated with the tenant;
      receive telemetry data for the tenant;
      identify anomalies in the telemetry data received for the tenant;
      determine a classification for one or more of the anomalies based on the telemetry data; and
      for at least an anomaly of the one or more of the anomalies:
         determine a severity score for the anomaly based at least on the classification determined for the anomaly and the health classification determined for the tenant; and
         determine an impact of the anomaly to the tenant based at least on the severity score determined for the anomaly;
         generate triage data for the anomaly;
         identify an existing mitigation effort applicable to the anomaly and associated with a user distinguished from tenants in the multi-tenant environment;
         generate an updated mitigation effort based on the triage data; and
         send a notification comprising details about the updated mitigation effort.

2. The computing device of claim 1, wherein the computing device comprises a machine learning environment.

3. The computing device of claim 2, wherein the machine learning environment comprises an anomaly classifier configured to:
   determine classifications for the anomalies in the telemetry data, including the classification for the anomaly; and
   generate filtered telemetry data based on the classifications of the anomalies in the telemetry data.

4. The computing device of claim 3, wherein the machine learning environment comprises a tenant health classifier configured to:
   determine health classifications for a plurality of tenants, including the health classification for the tenant; and
   generate filtered diagnostics data based on the health classifications.

5. The computing device of claim 1, wherein to identify the existing mitigation effort applicable to the anomaly, the executable program code directs the processor to identify an entry in a repository of mitigation efforts.

6. The computing device of claim 1, wherein the executable program code further directs the processor to generate the notification for transmission to a tenant in the multi-tenant environment.

7. The computing device of claim 1, wherein to determine the impact of the anomaly to the tenant based at least on the severity score, the executable program code directs the processor to determine that the impact is enterprise blocking.

8. A computer-implemented method, comprising:
   determining a health classification for a tenant, in a multi-tenant environment, based on diagnostic information associated with the tenant;
   receiving telemetry data for the tenant;
   identifying anomalies in the telemetry data received for the tenant;
   determining a classification for one or more of the anomalies based on the telemetry data; and
   for at least an anomaly of the one or more of the anomalies:
      determining a severity score for the anomaly based at least on the classification determined for the anomaly and the health classification determined for the tenant;
      determining an impact of the anomaly to the tenant based at least on the severity score determined for the anomaly;
      generating triage data for the anomaly;
      identifying an existing mitigation effort applicable to the anomaly and associated with a user distinguished from tenants in the multi-tenant environment;
      generating an updated mitigation effort based on the triage data; and
      sending a notification comprising details about the updated mitigation effort.

9. The computer-implemented method of claim 8, further comprising:
   determining classifications for the anomalies in the telemetry data, including the classification for the anomaly;
   generating filtered telemetry data based on the classifications of the anomalies in the telemetry data.

10. The method of claim 9, wherein the method further comprises: determining health classifications for a plurality of tenants, including the health classification for the tenant; and generating filtered diagnostics data based on the health classifications.

11. The computer-implemented method of claim 8, wherein identifying the existing mitigation effort comprises identifying an entry in a repository of mitigation efforts.

12. The computer-implemented method of claim 8, further comprising generating the notification for transmission to a tenant in the multi-tenant environment.

13. The method of claim 8, wherein determining the impact of the anomaly to the tenant based at least on the severity score comprises determining that the impact is enterprise blocking.

14. The method of claim 13, further comprising generating the triage data based on the impact to the tenant.

15. A computer readable storage device comprising executable instructions that, when executed by a processor, cause the processor to:
- determine a health classification for a tenant, in a multi-tenant environment, based on diagnostic information associated with the tenant;
- receive telemetry data for the tenant;
- identify anomalies in the telemetry data received for the tenant;
- determine a classification for one or more of the anomalies based on the telemetry data; and
- for at least an anomaly of the one or more of the anomalies:
  - determine a severity score for the anomaly based at least on the classification determined for the anomaly and the health classification determined for the tenant;
  - determine an impact of the anomaly to the tenant based at least on the severity score determined for the anomaly
  - generate triage data for the anomaly;
  - identify an existing mitigation effort applicable to the anomaly and associated with a user distinguished from tenants in the multi-tenant environment;
  - generate an updated mitigation effort based on the triage data; and
  - send a notification comprising details about the updated mitigation effort.

16. The computer readable storage device of claim 15, wherein the executable instructions further cause the processor to: determine classifications for the anomalies in the telemetry data, including the classification for the anomaly; generate filtered telemetry data based on the classifications of the anomalies in the telemetry data.

17. The computer readable storage device of claim 16, wherein the executable instructions further cause the processor to:
- determine health classifications for a plurality of tenants, including the health classification for the tenant; and
- generate filtered diagnostics data based on the health classifications.

18. The computer readable storage device of claim 15, wherein to identify the existing mitigation effort, the executable instructions cause the processor to identify an entry in a repository of mitigation efforts.

19. The computer readable storage device of claim 15, wherein the executable instructions further cause the processor to generate the notification for transmission to an anomaly mitigation team member.

20. The computer readable storage device of claim 15, wherein to determine the impact of the anomaly to the tenant based at least the severity score, the executable instructions cause the processor to determine that the impact is enterprise blocking.

* * * * *